United States Patent
Frazier et al.

(10) Patent No.: US 6,388,603 B1
(45) Date of Patent: May 14, 2002

(54) SYSTEM AND METHOD FOR BISTATICALLY DETERMINING ALTITUDE AND SLANT RANGE TO A SELECTED TARGET

(75) Inventors: Lawrence M. Frazier, West Covina; Benjamin G. Lewis, Corona, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/344,455

(22) Filed: Feb. 1, 1982

Related U.S. Application Data

(63) Continuation-in-part of application No. 06/215,306, filed on Dec. 11, 1980, now abandoned.

(51) Int. Cl.[7] .............................. G01S 7/36; G01S 7/42; H04K 3/00
(52) U.S. Cl. ......................................... 342/13; 342/118
(58) Field of Search ......................... 343/5 EM, 112 C, 343/112 D, 7.4, 7 A, 451, 458; 364/458, 460; 342/451, 458, 13, 118

(56) References Cited

U.S. PATENT DOCUMENTS

| | | | | |
|---|---|---|---|---|
| 2,639,422 A | * | 5/1953 | Harris | 343/112 R X |
| 2,971,190 A | * | 2/1961 | Busignies | 343/112 R |
| 3,185,980 A | * | 5/1965 | Gustafson et al. | 343/5 EM X |
| 3,487,462 A | * | 12/1969 | Holberg | 343/12 R |
| 3,812,493 A | * | 5/1974 | Afendykiw et al. | 343/112 R X |
| 3,943,514 A | * | 3/1976 | Afendykiw et al. | 343/16 M X |
| 3,971,018 A | * | 7/1976 | Isbister et al. | 343/5 EM X |
| 4,281,327 A | * | 7/1981 | Frazier et al. | 343/12 R |

* cited by examiner

*Primary Examiner*—Theodore M. Blum
(74) *Attorney, Agent, or Firm*—Leonard A. Alkov; Glenn H. Lenzen, Jr.

(57) ABSTRACT

A bistatic passive radar system is used in conjunction with a host transmitter that is a determinable distance D from the radar system for determining the distance D and for displaying video images of a selected target, the position of the radar system and the position of the transmitter on a display. The invention is characterized by a system and method of using the display to determine the slant range S and the altitude H of the selected target relative to the position of the radar system. Three alternative embodiments of the invention are disclosed.

26 Claims, 6 Drawing Sheets

— — — — POSITION OF B CURSOR WITH D SET TO ZERO
— — — — — SUCCESSIVE INTERIM POSITIONS OF B CURSOR
———————— CORRECT POSITION OF B CURSOR
———·——— POSITION OF B CURSOR WITH D OVERSHOT
◉ INTERIM & OVERSHOT POSITIONS OF VIDEO IMAGE OF TARGET
● FINAL & CORRECT POSITION OF VIDEO IMAGE OF TARGET

SYSTEM AND METHOD FOR BISTATICALLY DETERMINING ALTITUDE AND SLANT RANGE TO A SELECTED TARGET

CROSS REFERENCE TO RELATED PATENT APPLICATIONS

This is a continuation-in-part of U.S. patent application Ser. No. 06/215,306 filed Dec. 11, 1980 now abandoned by L. M. Frazier and B. G. Lewis entitled "System and Method for Bistatically Determining Altitude and Slant Range to a Selected Target"; and is related to the subject matter of U.S. patent application Ser. No. 304,458 filed Sep. 22, 1981 by L. M. Frazier and B. G. Lewis-entitled "Bistatic Passive Radar System With Improved Ranging."

BACKGROUND OF THE INVENTION

This invention relates to improvement in bistatic passive radar systems and methods and is directed particularly to using a bistatic passive radar system to determine the altitude and slant range of a selected target, such as a moving airborne target, that is illuminated by a host transmitter, such as a two dimensional scanning radar that is located remotely from the bistatic passive radar system.

In cross-referenced patent application No. 304,458, there is described a bistatic passive radar system in which the distance D (as therein identified) between a target illuminating scanning radar located on the ground (therein called a host transmitter) and a bistatic passive radar receiver (also located on the ground) is determined. This is accomplished by providing means for accurately measuring the azimuth angle B between a selected ground target being illuminated by the host transmitter and the direct line between the host transmitter and the bistatic receiver and, using this angle B along with other data, to accurately determine the range distance D to the host transmitter. To accomplish this purpose a repositionable single antenna or a second directional antenna as used with the bistatic radar system to measure the angle B.

To find the correct value of D, an iterative technique is used by which the angle of the latter antenna, directed towards the target, is displayed as a B cursor on a plan position indicator (PPI) of the passive radar system; and using a PPI display bistatic range correction circuit, the distance D is manually varied on the PPI display until the B cursor bisects the video image of the selected target on the display. When the video image of the selected target is bisected by the B cursor, the distance D on the PPI display is correct.

This iterative method of passively determining the distance D is based upon the assumption that the selected target (reflector of opportunity) is either a piece of ground clutter or an object at such a low elevational angle that it would be considered in a horizontal plane, since selected targets at substantial elevational, angles such as aircraft, would cause the measured distance D to be erroneous. Also, assuming that the distance D can be determined and correctly indicated on the PPI display, the slant range and altitude of a selected airborne target are not apparent from the display of the video image of the target on the display.

To illustrate this latter point, attention is directed to FIG. 1, herein, which illustrates the geometrical situation in three dimensions in relation to where the video image of a selected airborne target is displayed on the bistatically corrected two-dimensional PPI display described in cross-referenced patent No. 304,458. A moving airborne target at position T is directly above point P on the ground. A video image of the target would not be displayed on the PPI display as being at point P, however. The path of the radar signal from the position of the host transmitter $T_x$ to the position of the bistatic passive radar system $R_x$ is $R_s+S$, which is longer than the path $R_c+C$ in the horizontal plane of the host p transmitter and the radar system. As a result, a video image of the airborne target is falsely displayed at position F on the two-dimensional PPI display. Even though the azimuth angle $\phi$ to position F corresponds to the correct azimuth angle $\phi$ to point P beneath the target, the slant range S and the altitude H of the selected target in relation to the position $R_x$ of the radar system are not apparent from the display of the video image of the selected target at the false position F on the two-dimensional PPI display.

SUMMARY OF THE INVENTION

The present invention provides an improved system and method of using a bistatic passive radar system in conjunction with a host transmitter that is a determinable distance D from the radar system, for determining the distance D, and for displaying video images of a selected target, the position of the radar system and the position of the transmitter on a display. The invention is characterized by using the display to determine the slant range S and the altitude H of the selected target relative to the position of the radar system.

Various features of the invention are described in the description of the preferred embodiments.

DESCRIPTION OP THE PREFERRED EMBODIMENTS

Figure 1:
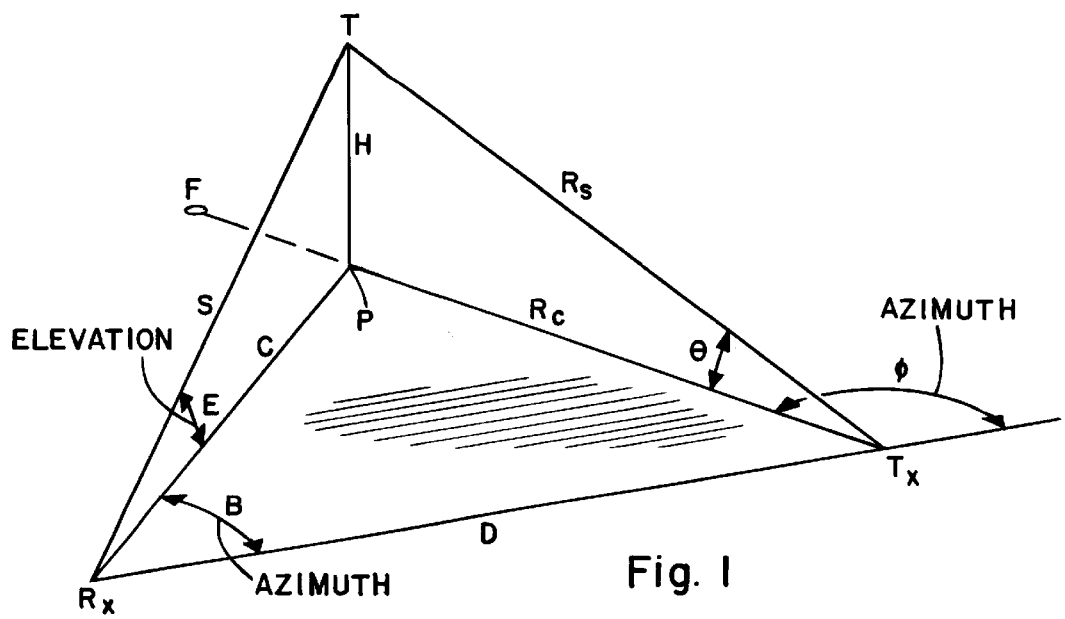
FIG. 1 illustrates the geometrical situation of a selected airborne target in three dimensions in relation to where the video image of the selected airborne target is displayed on a bistatically corrected two-dimensional PPI display.
Figure 2:
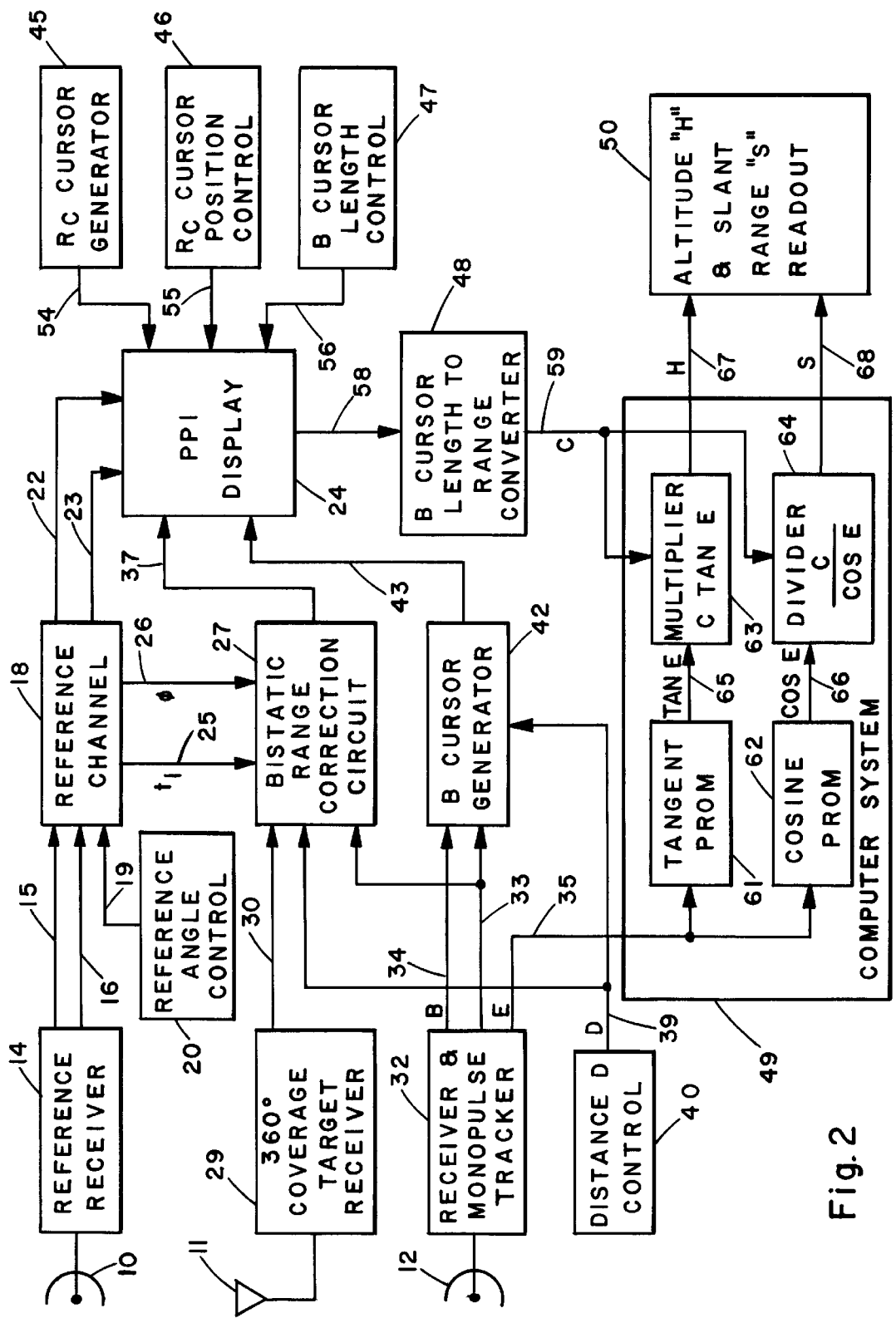
FIG. 2 is a schematic block diagram of one preferred embodiment of the system of the present invention.

The preferred embodiment of the system of the present invention shown in FIG. 2 includes three antennas located at position $R_x$ (in FIG. 1). They are a first directional antenna 10, an onmidirectional antenna 11 and a monopulse antenna 12.

The first directional antenna 10 is directed toward the host transmitter located at position $T_x$ for receiving the radar signal transmitted by the host transmitter. A reference receiver 14 is coupled to the first directional antenna 10. The reference receiver 14 includes a video amplifier for providing a video signal on line 15 in response to the radar signal received by the antenna 10. The reference receiver 14 further includes a synchro system for providing a signal on line 16 that indicates the azimuth angle of the antenna 10.

The signals on lines 15 and 16 are provided to a reference channel 18 in combination with a reference angle signal that is provided on line 19 from a reference angle control circuit 20 for indicating the azimuth reference angle of the bistatic passive radar system in relation to the host transmitter.

The reference channel 18 contains conventional circuitry for responding to the signals on lines 15, 16 and 19 to provide an azimuth sweep trigger signal on line 22 and range sweep trigger signals on line 23 to a PPI display 24; and to provide a periodic transmitter sweep rate time base signal $t_1$ on line 25 and a signal representative of the azimuth angle $\phi$ at which the host transmitter is directed on line 26 to a bistatic range correction circuit 27. The azimuth angle $\phi$, as shown in FIG. 1, is the azimuth angle between the extension of a line extending from the position of the radar system through the host transmitter and a line extending from the host transmitter to the selected target.

A 360° coverage target receiver 29 is coupled to the omnidirectional antenna 11. The receiver 29 includes a video amplifier for providing a video signal on line 30 in response to radar signals received by the omnidirectional antenna 11 either directly from the host transmitter or as reflected from targets of opportunity as the host transmitter radar signal is being swept over the area within the range of the bistatic passive radar system. A receiver and monopulse tracker 32 is coupled to the monopulse antenna 12. The receiver and monopulse tracker 32 includes a tracking system for changing the operation of the monopulse antenna 12 between a fan-beam mode and a narrow pencil-beam mode, for slewing the antenna 12 in azimuth and in elevation to track a selected target and for locking onto the selected target. The receiver and monopulse tracker 32 also includes a video amplifier for providing a video signal on line 33 in response to radar signals reflected from the selected target. The receiver and monopulse tracker 32 further includes a synchro system for determining the azimuth and elevation components of the point angle of the monopulse antenna 12. The synchro system provides a B angle signal on line 34 for indicating the azimuth angle B between the line of sight from the position of the radar system $R_x$ to the position of the host transmitter $T_x$ and a line extending from the radar system to the selected target (see FIG. 1). The synchro system also provides an E angle signal on line 35 for indicating the angle of elevation E at which the selected target is tracked (see FIG. 1).

The video signals on lines 30 and 33 are provided to the bistatic range correction circuit 27. The bistatic range correction circuit 27 computes a corrected horizontal range $R_c$ from the host transmitter to each target that reflects a radar signal to the omnidirectional antenna 11 and provides a video signal on line 37 to the PPI display 24 for causing a video image of each such target to be displayed on the PPI display 24 at a position representative of the corresponding corrected horizontal range $R_c$. The video signals on line 30 and 33 are combined to intensify the video image of the selected target at which the monopulse antenna 12 is pointed.

The bistatic range correction circuit 27 computes the corrected range $R_c$ in accordance with the following equation:

$$R_c = \frac{R_a^2 + 2R_a D}{R_a + D(1 + \cos\phi)}. \quad (1)$$

The apparent range $R_a$ is determined by measuring the time of arrival of the respective reflected radar signals received by the omnidirectional antenna 11 as indicated by the video signal on line 30 in relation to the periodic transmitter sweep rate time base signal $t_1$ on line 25. The azimuth angle $\phi$ is indicated by the signal on line 26.

The distance D between the radar system and the host transmitter is indicated to the bistatic range correction circuit 27 by a D signal on line 39 from a manually adjustable distance D control circuit 40.

A bistatic range correction circuit for computing the corrected range $R_c$ is described in U.S. Pat. No. 4,281,327, the disclosure of which is incorporated herein by reference thereto.

The distance D control 40 is coupled to a B cursor generator 42 and is used in conjunction therewith and with the PPI display 24 for determining the distance D from the radar system to the host transmitter. Such determination of the distance D is fully described in cross-referenced application No. 304,458, the disclosure of which is incorporated herein by reference thereto. Such determination is accomplished as follows.

The monopulse antenna 12 is directed to a selected stationary ground target. The B cursor generator 42 responds to the video signal on line 33, the B angle signal on line 34 and the D signal on line 39 by providing a video signal on line 43 to the PPI display 24 that causes a B cursor to be displayed on the PPI display 24 at the angle B from the line extending between the displayed positions of the radar system $R_x$ and the host transmitter $T_x$. The displayed position $T_x$ of the host transmitter is the center of the PPI display 24. The displayed position $R_x$ of the radar system is dependent on the value of D that is indicated by the D signal provided on line 39 by the manually adjustable distance D control 40.

Figure 3:
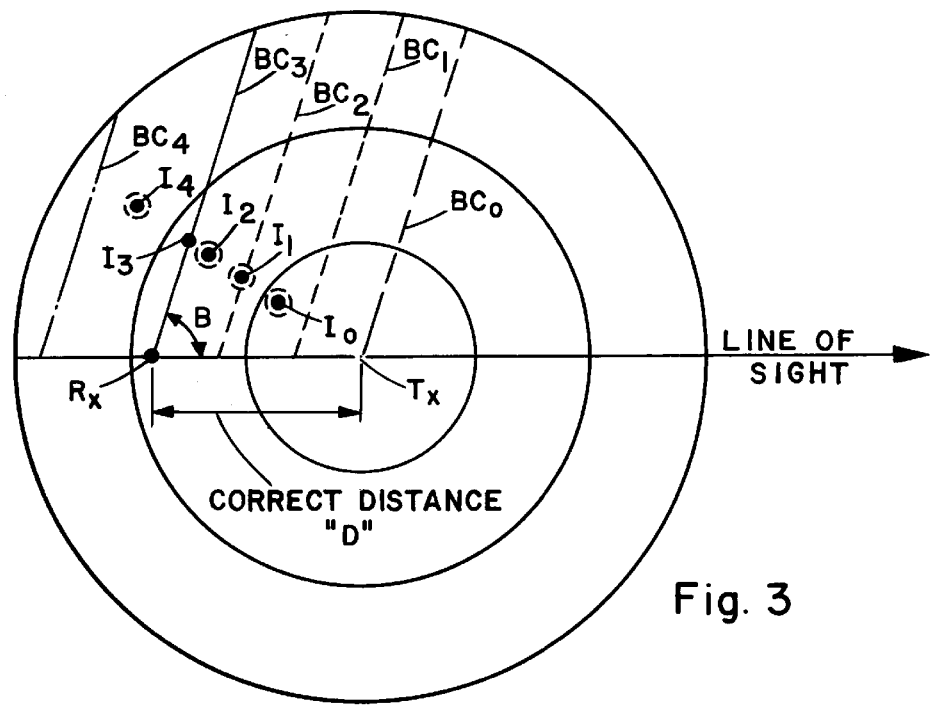
FIG. 3 illustrates the operation of a PPI display in the systems of FIGS. 2, 7 and 10 to determine to distance D between the radar system and the host transmitter.

FIG. 3 shows B cursors $BC_0$, $BC_1$, $BC_2$, $BC_3$ and $BC_4$, at different positions on the PPI display 24 in accordance with different values of D indicated by the D signal on line 39, and further shows video images $I_0$, $I_1$, $I_2$, $I_3$, and $I_4$ of the selected ground target at different positions on the PPI display 24 in accordance with different values of corrected horizontal range $R_c$ computed by the bistatic range correction circuit in response to the corresponding different values of D indicated by the D signal on line 39.

B cursor $BC_0$ and video image $I_0$ are displayed simultaneously on the PPI display 24 when the D signal on line 39 indicates zero distance between the positions of the radar system $R_x$ and the host transmitter $T_x$. Corresponding simultaneous displays of the B cursor and the video image of the selected target on the PPI display 24 are designated by common subscripts in FIG. 3.

As taught in cross-referenced application No. 304,458, the B cursor bisects the video image of the selected target only when the correct value of D is indicated by the D signal on line 39.

When the value of D indicated by the D signal on line 39 is less than the correct distance D, the video image of the selected target is displayed to the left of the B cursor; and when the value of D indicated by the D signal on line 39 overshoots (exceeds) the correct distance D, the video image of the selected target is displayed to the right of the B cursor.

In FIG. 3, B cursor and video image pairs $BC_1$ and $I_1$, and $BC_2$ and $I_2$ illustrate interim displayed positions between where the D signal indicates zero distance and the correct distance D. B cursor and video image pair $BC_3$ and $I_3$ illustrate the displayed positions when the D signal indicates the correct distance D. B cursor and video image pair $BC_4$ and $I_4$ illustrate an overshot displayed position where the D signals indicates a value of D in excess of the correct distance D.

Thus the correct distance D between the radar system and the host transmitter can be readily determined by manually adjusting the distance D control 40 to vary the D signal on line 39 until the B cursor bisects the video image of the selected stationary ground target on the PPI display. This procedure preferably is repeated with several such targets to refine the determination. The correct value of D determined by this procedure is indicated by the D signal on line 39 and is used by the bistatic range correction circuit in computing the corrected horizontal range $R_c$.

Alternatively, the distance D can be computed by a digital computer from the parameters $R_a$, $\phi$ and B, as measured and computed in relation to a selected stationary ground target, in accordance with the following equation:

$$D = \frac{R_a \sin(\phi - B)}{\sin B + \sin\phi - \sin(\phi - B)}. \quad (2)$$

However, the emperical procedure of determining the distance D described with reference to FIGS. 2 and 3 is preferred.

For determining the slant range S and the altitude H of a selected airborne target relative to the position of the radar system, the preferred embodiment of the radar system shown in FIG. 2 further includes a $R_c$ cursor generator 45, a manually adjustable $R_c$ cursor position control circuit 46, a manually adjustable B cursor length control circuit 47, a B cursor length to range converter 48, a computer system, 49 and an altitude H and slant range S readout device 50.

Figure 4:
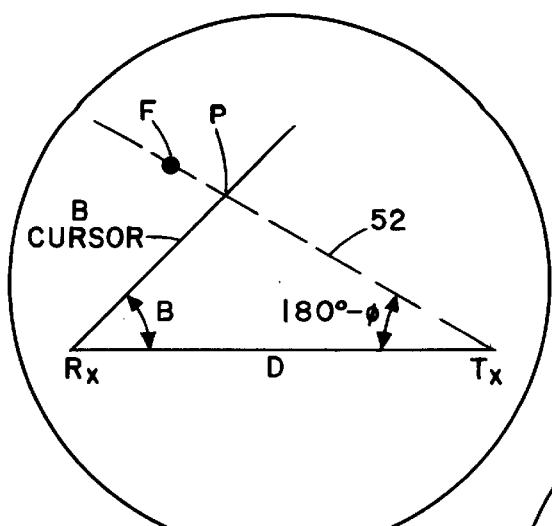
FIGS. 4, 5, and 6 illustrates the use of the PPI display in the system of FIGS. 2 and 7 to determine the slant range S and the altitude H of the selected target relative to the position of the radar system.

FIG. 4 illustrates the display of the video image of a selected airborne target at position F on the PPI display 24. A "B" cursor is also generated and displayed at the angle B from the line extending between the displayed positions of the radar system $R_x$ and the host transmitter $T_x$. The B cursor is extended from the displayed position $R_x$ of the radar system. Position P on the PPI display 24 is the correct horizontal position the selected airborne target as discussed with reference to FIG. 1. Position P is at the intersection of B cursor and an imaginary line 52 extending between positions of the video image F and the host transmitter $T_x$ on the PPI display 24.

Figure 5:
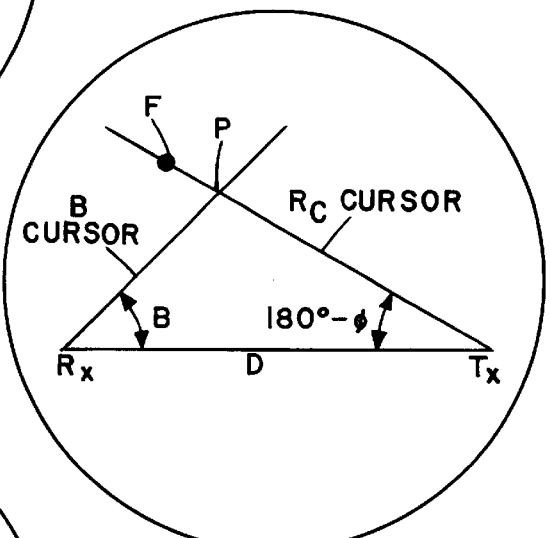

The $R_c$ cursor generator 45 provides a video signal on line 54 to the PPI display 24 that causes an $R_c$ cursor to be displayed on the PPI display 24; and the $R_c$ cursor position control circuit 46 provides a signal on line 55 to the PPI display 24 for enabling the $R_c$ cursor to be positioned on the PPI display 24 at a desired location as shown in FIG. 5. The $R_c$ cursor position control circuit is manually adjusted to cause the $R_c$ cursor to extend from the displayed position $T_x$ of the host transmitter to bisect the video image of the selected target at position F on the PPI display 24. Again, point P on the display 24 represents the correct horizontal position of the selected airborne target that is displayed at position F.

Figure 6:
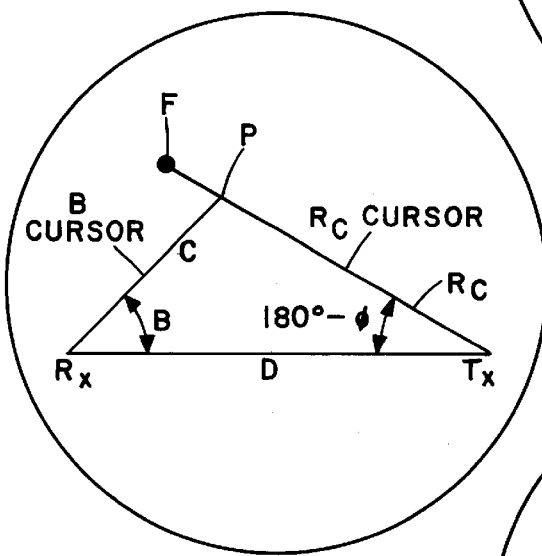

The B cursor length control circuit 47 is manually adjusted to provide a signal on line 56 to the PPI display 24 for controlling the length of the B cursor so that the B cursor extends from the displayed position $R_x$ of the radar system to the $R_c$ cursor, as shown in FIG. 6. The length of the B cursor as displayed in FIG. 6 corresponds to the horizontal range C from the radar system to the selected target. See FIG. 1.

A signal is provided on line 58 from the PPI display 24 for indicating the length of the B cursor. The B cursor length to range converter circuit 48 responds to the signal on line 58 by providing a horizontal range signal on line 59 that indicates the horizontal range C from the radar system to the selected target.

The computer system 49 computes the slant range S and the altitude H by using the determined horizontal range C indicated by the signal on line 49 and the determined angle of elevation E indicated by the signal on line 35. The computer system 49 includes a tangent PROM 61, a cosine PROM 62, a multiplier 63, and a divider 64.

The tangent PROM 61 responds to receipt of the E signal on line 35 by providing a signal on line 65 that is representative of the tangent of the angle of elevation E. The cosine PROM 62 responds to receipt of the E angle signal on eline 35 by providing a signal on line 66 that is representative of the cosine of the angle of elevation E. The multiplier 63 multiplies the value of tan E indicated by the signal on line 65 by the value of the horizontal range C indicated by the signal on line 59 to provide an altitude signal on line 67 that indicates the altitude H of the selected target. (See FIG. 1). The divider 64 divides the value of cos E indicated by the signal on line 66 by the value of the horizontal range C indicated by the signal on line 59 to provide a slant range signal on line 68 that indicates the slant range S from the radar system to the selected target. See FIG. 1.

The readout device 50 provides a visual readout of the altitude H and the slant range S in response to the signals on lines 67 and 68 respectively.

Figure 7:
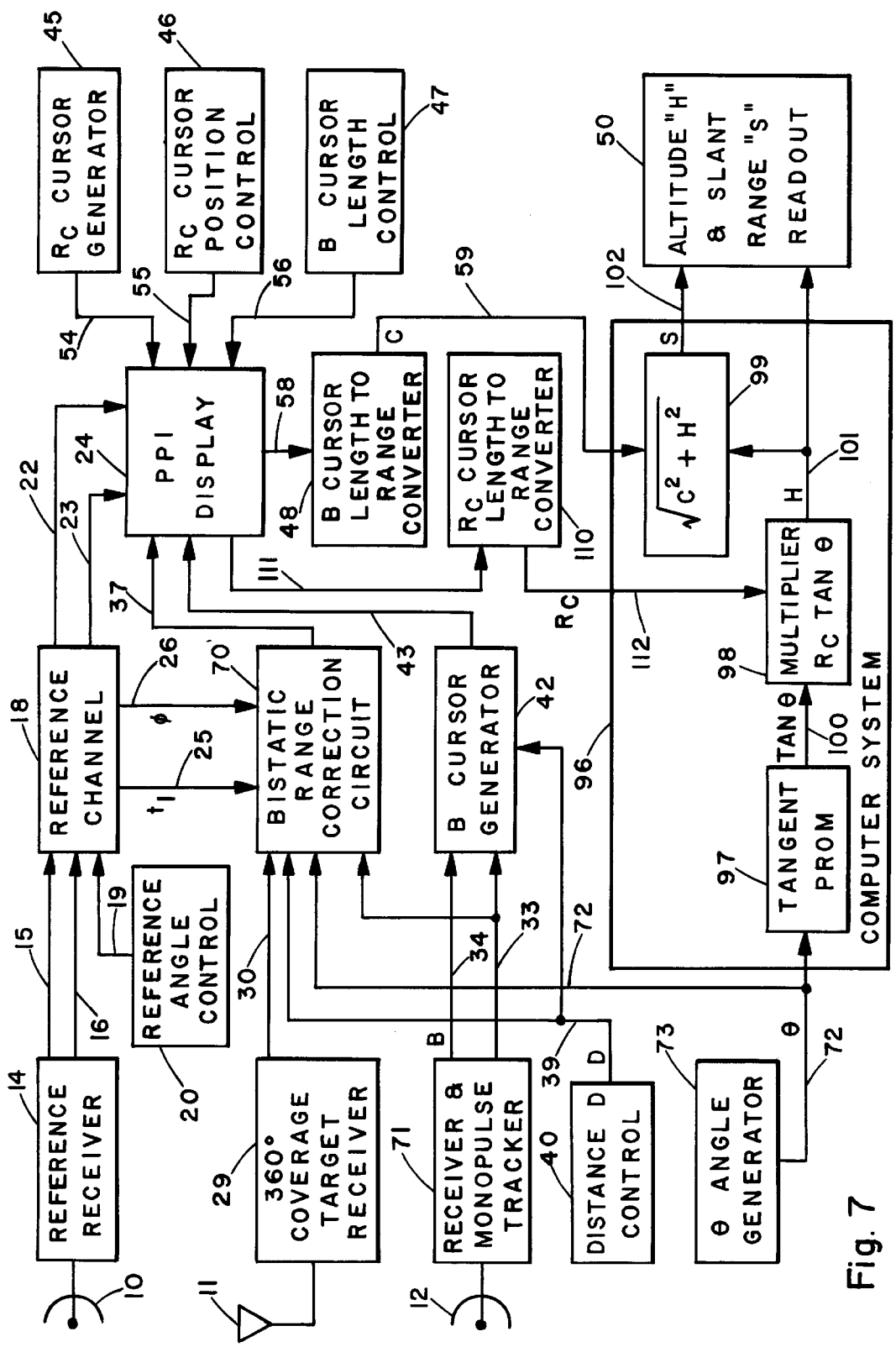
FIG. 7 is a schematic block diagram of another preferred embodiment of the system of the present invention.

Another preferred embodiment of the present invention is shown in FIG. 7. The system of FIG. 7 includes a number of the same components that are included in the system of FIG. 2; and these components are referred to by the same reference numerals in the description of the system of FIG. 7.

The preferred embodiment shown in FIG. 7 includes three antennas located at position $R_x$ (in FIG. 1). They are a first directional antenna 10, an omnidirectional antenna 11 and a monopulse antenna 12. The first directional antenna 10 is directed toward the host transmitter located at position $T_x$ for receiving the radar signal transmitted by the host transmitter. A reference receiver 14 is coupled to the first directional antenna 10. The reference receiver 14 includes a video amplifier for providing a video signal on line 15 in response to the radar signal received by the antenna 10. The reference receiver 14 further includes a synchro system for providing a signal on line 16 that indicates the azimuth angle of the antenna 10.

The signals on line 15 and 16 are provided to a reference channel 18 in combination with a reference angle signal that is provided on line 19 from a reference angle control circuit 20 for indicating the azimuth reference angle of the bistatic passive radar system in relation to the host transmitter.

The reference channel 18 contains conventional circuitry for responding to the signals on lines 15, 16, and 19 to provide an azimuth sweep trigger signal on line 22 and range sweep trigger signals on line 23 to a PPI display 24; and to provide a periodic transmitter sweep rate time base signal $t_1$ on line 25 and a signal representative of the azimuth angle $\phi$ at which the host transmitter is directed on line 26 to a bistatic range correction circuit 70. The azimuth angle φ as shown in FIG. 1, is the azimuth angle between the extension of a line extending from the position of the radar system through the host transmitter and a line extending from the host transmitter to the selected target.

A 360° coverage target receiver 29 is coupled to the omnidirectional antenna 11. The receiver 29 includes a video amplifier for providing a video signal on line 30 in response to radar signals received by the omnidirectional antenna 11 either directly from the host transmitter or as reflected from targets of opportunity as the host transmitter radar signal is being swept over the area within the range of the bistatic passive radar system.

A receiver and monopulse tracker 71 is coupled to the monopulse antenna 12. The receiver and monopulse tracker 71 includes a tracking system for changing the operation of the monopulse antenna 12 between a fan-beam mode and a narrow pencil-beam mode, for slewing the antenna 12 in azimuth and in elevation to track a selected target and for locking onto the selected target. The receiver and monopulse tracker 71 also includes a video amplifier for providing a video signal on line 33 in response to radar signals reflected from the selected target. The receiver and monopulse tracker 71 further includes a synchro system for determining the azimuth component of the point angle of the monopulse antenna 12. The synchro system provides a B angle signal on line 34 for indicating the azimuth angle B between the line of sight from the position of the radar system $R_x$ to the position of the host transmitter $T_x$ and a line extending from the radar system to the selected target. (See FIG. 1).

The video signals on lines 30 and 33, and the B angle are provided to the bistatic range correction circuit 70. The bistatic range correction circuit 70 computes a corrected horizontal range $R_c$ from the host transmitter to each target that reflects a radar signal to the omnidirectional antenna 11 and provides a video signal on line 37 to the PPI display 24 for causing a video image of each such target to be displayed on the PPI display 24 at the position representative of the corresponding corrected horizontal range $R_c$. The video signals on lines 30 and 33 are combined to intensify the video image of the selected target at which the monopulse antenna 12 is 5 pointed.

The bistatic range correction circuit 70 computes the corrected range $R_c$ in accordance with the following equation.

$$R_c = \frac{(R_a^2 + 2R_a D)\cos\theta}{2R_a + 2D(1 - \cos\theta\cos\phi)}; \quad (3)$$

θ is a variable angle of elevation from the host transmitter. (See FIG. 1)

The angle θ is indicated by a signal on line 72 from a manually adjustable θ angle generator 73.

The apparent range $R_a$ is determined by measuring the time of arrival of the respective reflected radar signals received by the omnidirectional antenna 11 as indicated by the video signal on line 33 in relation to the periodic transmitter sweep rate time base signal $t_1$ on line 25. This is more fully described in U.S. Pat. No. 4,281,327 the disclosure of which is incorporated herein by reference thereto.

The azimuth angle φ is indicated by the signal on line 26.

The distance D between the radar system and the host transmitter is indicated to the bistatic range control circuit 70 by a D signal on line 39 from a manually adjustable distance D control circuit 40.

The distance D control 40 is coupled to a B cursor generator 42 and is used on conjunction therewith and with the PPI display 24 for determining the distance D from the radar system to the host transmitter. Such determination of the distance D is fully described above in the description of the system of FIG. 2 with reference to FIG. 3. This determination is made by selecting a ground target of opportunity, and with the e angle generator 73 adjusted to provide a signal on line 72 indicating a θ angle of zero degrees, whereby $R_s=R_c$.

Figure 8:
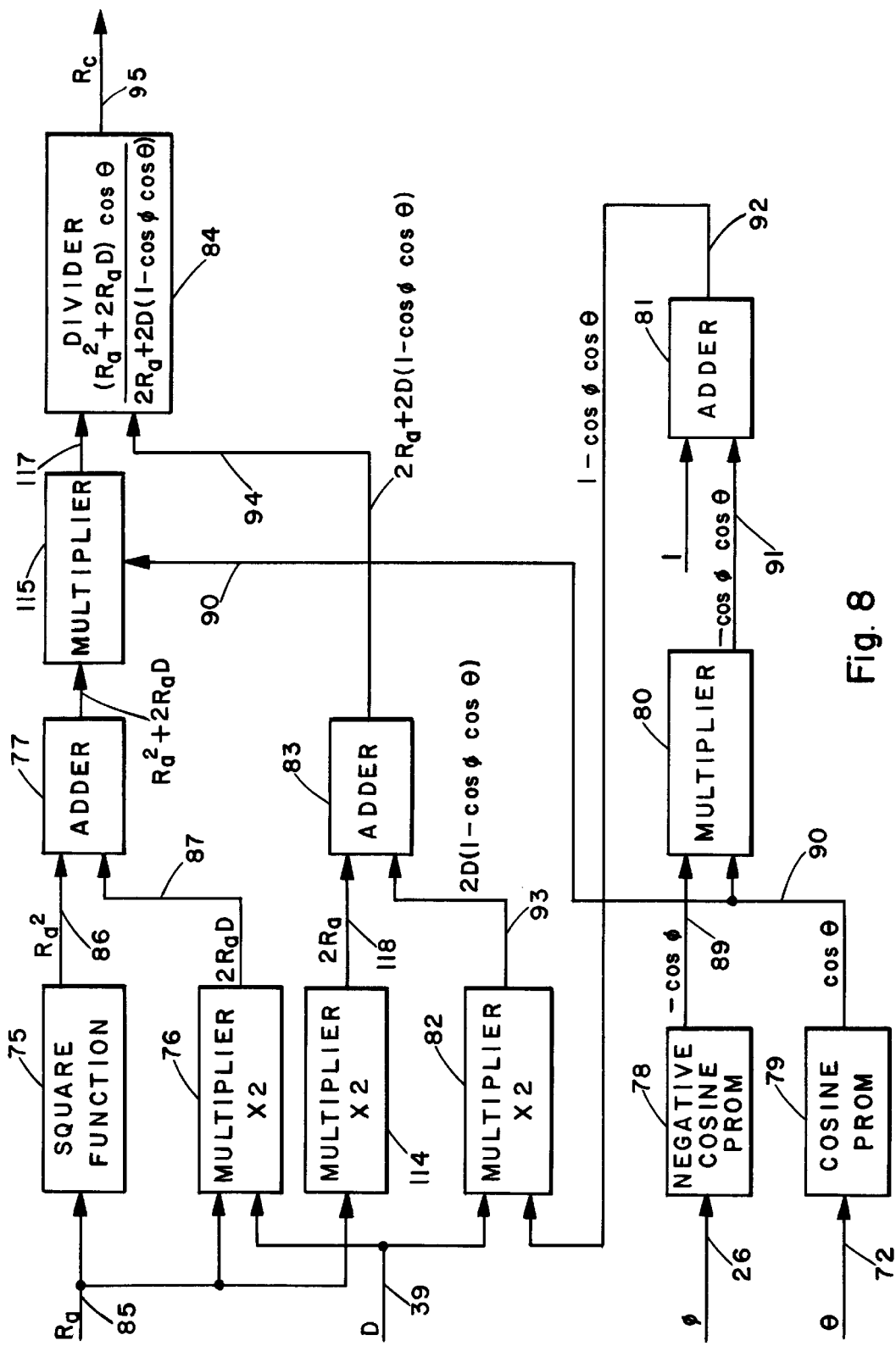
FIG. 8 is a schematic block diagram illustrating certain computation functions performed by the bistatic range correction circuit included in the systems of FIGS. 7 and 10.

Referring to FIG. 8, the portion of the bistatic range correction circuit 70 that is used for computing the corrected horizontal range $R_c$, includes a square function generator 75, a multiplier and doubler 76, and adder 77, a negative cosine PROM 78, a cosine PROM 79, a multiplier 80, and adder 81, a multiplier and doubler 82, an adder 83, a divider 84, a doubler 114, and a multiplier 115.

A signal indicating the value of the apparant range $R_a$ is provided on line 85.

The square function generator 75 squares the value of $R_a$ indicated by the signal on line 85 to provide a signal on line 86 that indicates the value of $R_a^2$.

The multiplier and doubler 76 multiplies the value of $R_a$ indicated by the signal on line 85 times the values of the distance D indicated by the signal on line 39 and doubles the product to provide a signal on line 87 that indicates the value of $2R_a^D$.

The adder 77 adds the values of $R_a^2$ and $2R_a^D$ respectively indicated by the signals on lines 86 and 87 to provide a signal on line 88 that indicates the value of $R_a^2+2R_a^D$.

The negative cosine PROM 78 responds to receipt of the φ signal on line 26 by providing a signal on line 89 that indicates the negative of the cosine of the azimuth angle φ.

The cosine PROM 79 responds to receipt of the θ signal on line 72 by providing a signal on line 90 that indicates the cosine of the elevation angle θ.

The multiplier 80 multiplies the value of cos φ indicated by the signal on line 89 times the value of cos θ indicated by the signal on line 90 to provide a signal on line 91 that indicates −cos φ cos θ.

The adder 81 adds the quantity "1" to the value of −cos φ cos θ indicated by the signal on line 91 to provide a signal on line 92 that indicates the quantity 1−cos φ cos θ.

The multiplier and doubler 82 multiplies the value of D indicated by the signal on line 39 times the value of 1+cos φ cos θ indicated by the signal on line 92 and doubles the product to provide a signal on line 93 that indicates D(1 +cos φ cos θ).

The doubler 114 doubles the value of $R_a$ indicated by the signal on line 85 to provide a signal on line 118 that indicates $2R_a$.

The adder 83 adds the value of $R_a$ indicated by the signal on line 118 to the value of 2D(1−cos φ cos θ) indicated by the signal on line 93 to provide a signal on line 94 that indicates $2R_a$+2D(1−cos φ cos θ).

The multiplier 115 multiplies the value of $R_a+2R_aD$ indicated by the signal on line 88 times the value of cos θ indicated by the signal on line 90 to provide a signal on line 117 that indicates $(R_a^2+2R_a^D)$ cos θ.

The divider 84 divides the value of $(R_a^2+2R_aD)$ cosθ indicated by the signal on line 117 by the value of $2R_a$+2D (1−cos φ cos θ) indicated by the signal on line 94 to provide a signal on line 95 that indicates the corrected horizontal range $R_c$. This value of $R_c$ is used in generating the video signal that is provided on line 37 to the PPI display 24.

For determining the slant range S and the altitude H of a selected airborne target relative to the position of the radar system, the preferred embodiment of the radar system shown in FIG. 7 further includes an $R_c$ cursor generator 45, a manually adjustable $R_c$ cursor position control circuit 46, a manually adjustable B cursor length control circuit 47, a B cursor length to range converter 48, an $R_c$ cursor length to range converter 110, a computer system 96 and an altitude H and slant range S readout device 50.

FIG. 4 illustrates the display of the video image of a selected airborne target at position F on the PPI display 24. A B cursor is also generated and displayed at the angle B from the line extending between the displayed positions of the radar system $R_x$ and the host transmitter $T_x$. The B cursor is extended from the displayed position $R_x$ of the radar system.

Position P on the PPI display 24 is the correct horizontal position of the selected airborne target as discussed with reference to FIG. 1. Position P is at the intersection of the B cursor and an imaginary line 52 extending between positions of the video image F and the host transmitter $T_x$ on the PPI display 24.

The $R_c$ cursor generator 45 provides a video signal on line 54 to the PPI display 24 that causes an $R_c$ cursor to be displayed on the PPI display 24; and the $R_c$ cursor position control circuit 46 provides a signal on line 55 to the PPI display 24 for enabling the $R_c$ cursor to be positioned on the PPI display 24 at the desired location as shown in FIG. 5. The $R_c$ cursor position control circuit is manually adjusted to cause the $R_c$ cursor to extend from the displayed position $T_x$ of the host transmitter to bisect the video image of the selected target at position F on the PPI display 24. Again, point P on the display 24 represents the correct horizontal position of the selected airborne target that is displayed at position F.

The B cursor length control circuit 47 is manually adjusted to provide a signal on line 56 to the PPI display 24 for controlling the length of the B cursor so that the B cursor extends from the displayed position $R_x$ of the radar system to the $R_c$ cursor, as shown in FIG. 6. The length of the B cursor as displayed in FIG. 6 corresponds to the horizontal range C from the radar system to the selected target. See FIG. 1.

A signal is provided on line 58 from the PPI display 24 for indicating the length of the B cursor. The B cursor length to range converter circuit 48 responds to the signal on line 58 by providing a horizontal range signal on line 59 that indicates the horizontal range C from the radar system to the selected target.

Figure 9:
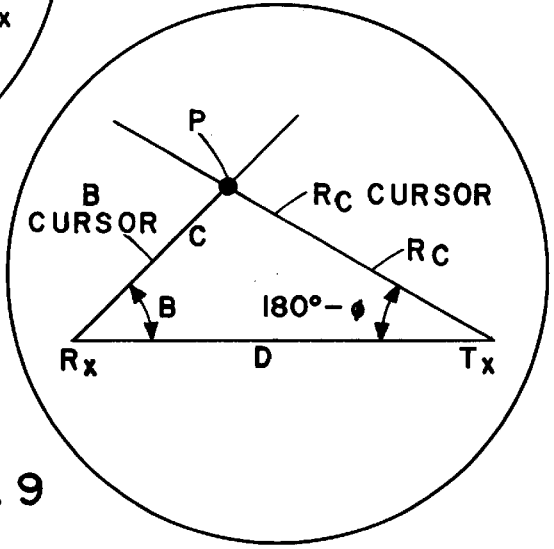
FIG. 9 illustrates the further use of the PPI display in the systems of FIGS. 7 and 10 to determine the slant range S and the altitude H of the selected target relative to the position of the radar system.

Referring to FIG. 9, the θ angle generator 73 is manually adjusted to change the value of the angle of elevation θ indicated by the signal on line 72. As a result, the value of the corrected horizontal range $R_c$ computed by the bistatic range correction circuit 70 is varied accordingly and the position at which the video image of the selected airborne target is displayed on the PPI display in response to the signal on line 37 is also varied. The θ angle generator 73 is manually adjusted until the video image of the selected airborne target is aligned with the B cursor, as indicated by the spot at position P in FIG. 9.

The value of θ indicated by the signal on line 72 when the video image of the selected airborne target is aligned with the B cursor, is the correct elevation angle $θ_c$ from the host transmitter to the selected airborne target; and the value of $R_c$ indicated by the signal on line 112 when the video image of the selected airborne target is aligned with the B cursor is the correct horizontal range $R_c$ from the host transmitter to the selected airborne target.

However, the value indicated by the signal on line 95 changes as the radar system scans from one target to another. Therefore, the $R_c$ cursor position control 46 is adjusted to make the length of the $R_c$ cursor on the PPI display extend from the position of the host transmitter $T_x$ to the correct target position P, and a signal is provided on line 111 that indicates the length of the $R_c$ cursor. The $R_c$ cursor length to range converter 110 responds to the signal on line 111 by providing a signal on line 112 that indicates the horizontal range $R_c$ from the host transmitter to the selected target.

The computer system 96 uses the values of $θ_c$ and $R_c$ indicated by the signals on lines 72 and 95 respectively when θ equals $θ_c$ so that the video image of the selected airborne target is aligned with the B cursor, to compute the altitude H of the selected airborne target. The computer system uses this computed value of the altitude H and the value of horizontal range C from the radar system to the selected airborne target to compute the slant range S from the radar system to the selected airborne target.

The computer system 96 includes a tangent PROM 97, a multiplier 98 and a function generator 99.

The tangent PROM 97 responds to receipt of the θ signal on line 72 by providing a signal on line 100 that indicates the tangent of the correct elevation angle θ.

The multiplier 98 multiplies the value of tan θ indicated by the signal on line 100 by the value of the corrected horizontal range $R_c$ indicated by the signal on line 112 to provide a signal on line 100 that indicates the altitude H of the selected airborne target. See FIG. 1.

The function generator responds to receipt of the signal on line 101 indicating the value of the altitude H and the signal on line 59 indicating the horizontal range C from the radar system to the selected airborne target by generating a signal on line 102 that indicates the square root of the sum of the squares of C and H, and thereby the slant range S. See FIG. 1.

$$S=\sqrt{C^2+H^2} \qquad (4)$$

The readout device 50 provides a visual readout of the altitude H and the slant range S in response to the signals on lines 101 and 102 respectively.

Figure 10:
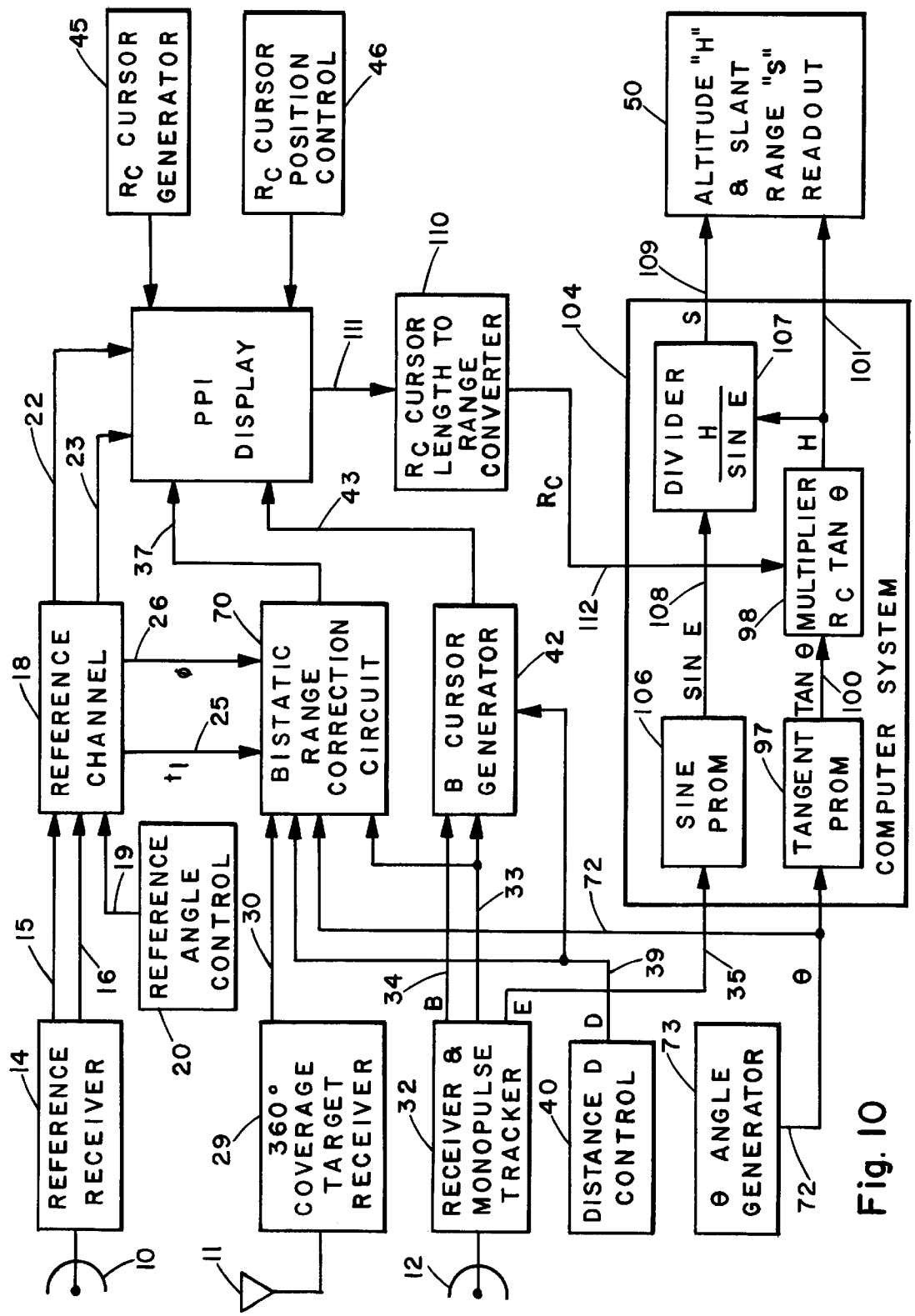
FIG. 10 is a schematic block diagram of still another preferred embodiment of the system of the present invention.

Another preferred embodiment of the present invention is shown in FIG. 10. The system of FIG. 10 includes a number of the same components that are included in the systems of FIGS. 2 and 7; and these components are referred to by the same reference numerals in the description of the system of FIG. 10.

The preferred embodiment of the system of the present invention shown in FIG. 10 includes three antennas located at position $R_x$ (in FIG. 1). They are a first directional antenna 10, an omnidirectional antenna 10 and a monopulse antenna 12.

The first directional antenna 10 is directed toward the host transmitter located at position $T_x$ for receiving the radar signal transmitted by the host transmitter. A reference receiver 14 is coupled to the first directional antenna 10. The reference receiver 14 includes a video amplifier for providing a video signal on line 15 in response to the radar signal received by the antenna 10. The reference receiver 14 further includes a synchro system for providing a signal on line 16 that indicates the azimuth angle of the antenna 10.

The signal on lines 15 and 16 are provided to a reference channel 18 in combination with a reference angle signal that is provided on line 19 from a reference angle control circuit 20 for indicating the azimuth reference angle of the bistatic passive radar system in relation to the host transmitter.

The reference channel 18 contains conventional circuitry for responding to the signals on lines 15, 16 and 19 to provide an azimuth sweep trigger signal on line 22 and range sweep trigger signals on line 23 to a PPI display 24; and to provide a periodic transmitter sweep rate time base signal $t_1$ on line 25 and a signal representative of the azimuth angle φ at which the host transmitter is directed on line 26 to a bistatic range correction circuit 70. The azimuth angle φ, as shown in FIG. 1, is the azimuth angle between the extension of a line extending from the position of the radar system through the host transmitter and a line extending from the host transmitter to the selected target.

A 360° coverage target receiver 29 is coupled to the omnidirectional antenna 11. The receiver 29 includes a video amplifier for providing a video signal on line 30 in response to radar signals received by the omnidirectional antenna 11 either directly from the host transmitter or as reflected from targets of opportunity as the host transmitter radar signal is being swept over the area within the range of the bistatic passive radar system.

A receiver and monopulse tracker 32 is coupled to the monopulse antenna 12. The receiver and monopulse tracker 32 includes a tracking system for changing the operation of the monopulse antenna 12 between a fan-beam mode and a narrow pencil-beam mode, for slewing the antenna 12 in azimuth and in elevation to track a selected target and for locking onto the selected target. The receiver and monopulse tracker 32 also includes a video amplifier for providing a video signal on line 33 in response to radar signals reflected from the selected target. The receiver and monopulse tracker 32 further includes a synchro system for determining the azimuth and elevation components of the point angle of the monopulse antenna 12. The synchro system provides a B angle signal on line 34 for indicating the azimuth angle B between the line of sight from the position of the radar system $R_x$ to the position of the host transmitter $T_x$ and a line extending from the radar system to the selected target (See FIG. 1). The synchro system also provides an E angle signal on line 35 for indicating the angle of elevation E at which the selected target is tracked. (See FIG. 1).

The video signals on lines 30 and 33 are provided to the bistatic range correction circuit 70. The bistatic range correction circuit 70 computes a corrected horizontal range $R_c$ from the host transmitter to each target that reflects a radar signal to the omnidirectional antenna 11 and provides a video signal on line 37 to the PPI display 24 for causing a video image of each such target to be displayed on the PPI display 24 at a position representative of the corresponding corrected horizontal range $R_c$. The video signals on lines 30 and 33 are combined to intensify the video image of the selected target at which the monopulse antenna 12 is pointed.

The bistatic range correction circuit 70 computes the corrected range $R_c$ in accordance with the following equation:

$$R_c = \frac{(R_a^2 + 2R_a D)\cos\theta}{2R_a + 2D(1-\cos\phi\cos\theta)}; \qquad (3)$$

θ is a variable angle of elevation from the host transmitter. See FIG. 1.

The angle θ is indicated by a signal on line 72 from a manually adjustable e angle generator 73.

The apparent range $R_a$ is determined by measuring the time of arrival of the respective reflected radar signals received by the omnidirectional antenna 11 as indicated by the video signal on line 33 in relation to the periodic transmitter sweep rate time base signal $t_1$ on line 25. This is more fully described in U.S. Pat. No. 4,281,327 the disclosure of which is incorporated herein by reference thereto.

The azimuth angle φ is indicated by the signal on line 26.

The distance D between the radar system and the host transmitter is indicated to the bistatic range control circuit 27 by a D signal on line 39 from a manually adjustable distance D control circuit 40.

The distance D control 40 is coupled to a B cursor generator 42 and is used in conjunction therewith and with the PPI display 24 for determining the distance D from the radar system to the host transmitter. Such determination of the distance D is fully described above in the description of the system FIG. 2 with reference to FIG. 3. This determination is made by selecting a ground target of opportunity, and with the θ angle generator adjusted to provide a signal on line 72 indicating a θ angle of zero degrees, whereby $R_s = R_c$.

The portion of the bistatic range correction circuit 70 that is used for computing the corrected horizontal range $R_c$ is described above with reference to the description of FIG. 8.

For determining the slant range S and the altitude H of a selected airborne target relative to the position of the radar system, the preferred embodiment of the radar system shown in FIG. 10 further includes a $R_c$ cursor generator 45, a manually adjustable $R_c$ cursor position control circuit 46, an $R_c$ cursor length to range converter 110, a computer system 104 and an altitude H and slant range S readout device 50.

FIG. 4 illustrates the display of the video image of a selected airborne target at position F on the PPI display 24. A B cursor is also generated and displayed at the angle B from the line extending between the displayed positions of the radar system $R_x$ and the host transmitter $T_x$. The B cursor is extended from the displayed position $R_x$ of the radar system. Position P on the PPI display 24 is the correct horizontal position the selected airborne target as discussed with reference to FIG. 1. Position P is at the intersection of B cursor and an imaginary line 52 extending between positions of the video image F and the host transmitter $T_x$ on the PPI display 24.

The $R_c$ cursor generator 45 provides a video signal on line 54 to the PPI display 24 that causes an $R_c$ cursor to be displayed on the PPI display 24; and the $R_c$ cursor position control circuit 46 provides a signal on line 55 to the PPI display 24 for enabling the $R_c$ cursor to be positioned on the PPI display 24 at a desired location as shown in FIG. 5. The $R_c$ cursor position control circuit is manually adjusted to cause the $R_c$ cursor to extend from the displayed position $T_x$ of the host transmitter to bisect the video image of the selected target at position F on the PPI display 24. Again point P on the display 24 represents the correct horizontal position of the selected airborne target that is displayed at position F.

Referring to FIG. 9, the θ angle generator 73 is manually adjusted to change the value of the angle of elevation θ indicated by the signal on line 72. As a result, the value of corrected horizontal range $R_c$ computed by the bistatic range correction circuit 70 is varied accordingly and the position at which the video image of the selected airborne target is displayed on the PPI display in response to the signal on line 37 is also varied. The θ angle generator 73 is manually adjusted until the video image of the selected airborne target is aligned with the B cursor, as indicated by the spot at position P in FIG. 9. The value of θ indicated by the signal on line 72 when the video image of the selected airborne target is aligned with the B cursor is the correct elevation angle $θ_c$ from the host transmitter to the selected airborne target; and the value of $R_c$ indicated by the signal on line 95 when the video image of the selected airborne target is aligned with the B cursor is the correct horizontal range $R_c$ from the host transmitter to the selected airborne target.

However, the value indicated by the signal on line 95 changes as the radar system scans from one target to another. Therefore, the $R_c$ cursor position control 46 is adjusted to make the length of the $R_c$ cursor on the PPI display extend from the position of the host transmitter $T_x$ to the correct target position P, and a signal is provided on line 111 that indicates the length of the $R_c$ cursor. The $R_c$ cursor length to range converter 110 responds to the signal on line 111 by providing a signal on line 112 that indicates the horizontal range $R_c$ from the host transmitter to the selected target.

The computer system 104 uses the values of $\theta_c$ and $R_c$ indicated by the signals on lines 72 and 112 respectively when $\theta$ equals $\theta_c$ so that the video image of the selected airborne target is aligned with the B cursor, to compute the altitude H of the selected airborne target. The computer system uses this computed value of the altitude H and the determined angle of elevation E from the radar system to the selected airborne target to compute the slant range S from the radar system to the selected airborne target.

The computer system 104 includes a tangent PROM 97, a multiplier 98, a sine PROM 106 and a divider 107.

The tangent PROM 97 responds to receipt of the $\theta$ signal on line 72 by providing a signal on line 100 that indicates the tangent of the correct elevation angle $\theta$.

The multiplier 98 multiplies the value of $\tan \theta$ indicated by the signal on line 100 by the value of the corrected horizontal range $R_c$ indicated by the signal on line 95 to provide a signal on line 100 that indicates the altitude H of the selected airborne target. See FIG. 1.

The sine PROM 106 responds to receipt of the E signal on line 35 by providing a signal on line 108 that indicates the sine of the angle of elevation E.

The divider 107 divides the value of altitude H indicated by the signal on line 101 by the value of sin E indicated by the signal on line 108 to provide a signal on line 109 that indicates the slant range S from the radar system to the selected airborne target.

The readout device 50 provides a visual readout of the altitude H and the slant range S in response to the signals on lines 101 and 109 respectively.

What is claimed is:

1. A bistatic passive radar system for use in conjunction with a host transmitter that is a determinable distance D from the radar system, and which includes means for determining the distance D, a display and means for displaying video images of a selected target, the position of the radar system and the position of the transmitter on the display, characterized by means for using the display to determine the slant range S and the altitude H of the selected target relative to the position of the radar system.

2. A system according to claim 1, wherein the means for using the display to determine said slant range and altitude comprises means for displaying a first cursor on the display extending from the displayed position of the host transmitter to bisect the video image of the selected target;

means for determining the azimuth angle B between the line of sight from the radar system to the host transmitter and a line extending from the radar system to the selected target;

means for displaying a second cursor on the display at the angle B from the line extending between the displayed positions of the radar system and the host transmitter, and for extending the length of the second cursor from the displayed position of the radar system to terminate at the first cursor;

means for determining the horizontal range C from the radar system to the selected target in accordance with the length of the second cursor;

means for determining the angle of elevation E from the radar system to the selected target; and means for computing said slant range S and altitude H by using the determined horizontal range C from the radar system to the selected target and the determined angle of elevation E from the radar system to the selected target.

3. A system according to claim 2, wherein the means for determining the horizontal range C from the radar system to the selected target comprises a cursor length control for controlling the length of the second cursor, and a cursor length-to-range converter coupled to the cursor length control for providing a horizontal range signal as a function of second cursor length for indicating the horizontal range C from the radar system to the selected target.

4. A system according to claim 3, wherein the means for determining the angle of elevation comprises a tracking system for tracking the selected target; and means coupled to the tracking system for providing an E angle signal for indicating the angle of elevation E at which the selected target is tracked.

5. A bistatic passive radar system for use in conjunction with a host transmitter that is a determinable distance D from the radar system, and which includes means for determining the distance D, a display and means for displaying video images of a selected target, the position of the radar system and the position of the transmitter on the display, characterized by the means for displaying the video image of the selected target including means for determining the azimuth angle $\phi$ between the extension of a line extending from the radar system through the host transmitter and a line extending from the host transmitter to the selected target; means for determining the apparent range $R_a$ from the host transmitter to the selected target; and means for computing the corrected range $R_c$ from the host transmitter to the selected target in accordance with the equation:

$$R_c = \frac{(R_a^2 + 2R_a D)\cos\theta}{2R_a + 2D(1 - \cos\phi\cos\theta)};$$

and by the system comprising means for displaying a first cursor on the display extending from the displayed position of the host transmitter to bisect the video image of the selected target;

means for determining the azimuth angle B between the line of sight from the radar system to the host transmitter and a line extending from the radar system to the selected target;

means for displaying a second cursor on the display at the angle B from a line extending between the displayed positions of the radar system and the host transmitter, and for extending the length of the second cursor from the displayed position of the radar system to terminate at the first cursor;

means for determining the horizontal range C from the radar system to the selected target in accordance with the length of the second cursor;

means for multiplying the quantity $\cos \phi$ by a quantity $\cos \theta$ to provide the term $\cos \phi \cos \theta$ when computing $R_c$, wherein θ is a variable angle of elevation from the host transmitter, whereby when θ is the angle of the elevation $θ_c$ from the host transmitter to the selected target, the video image of the selected target is aligned with the second cursor;

means for computing the altitude H of the selected target relative to the position of the radar system by using the angle of elevation $θ_c$ and the value of $R_c$ that is computed when θ equals $θ_c$; and means for computing the slant range S of the selected target relative to the position of the radar system from the computed altitude H and the determined horizontal range C from the radar system to the selected target.

6. A system according to claim 5, wherein the means for determining the horizontal range from the radar system to the selected target comprises a cursor length control for controlling the length of the second cursor; and a cursor length-to-range converter coupled to the cursor length control for providing a horizontal range signal as a function of second cursor length for indicating the horizontal range C from the radar system to the selected target.

7. A system according to claim 6, comprising means for providing a variable θ angle signal for indicating the value of θ;

a first memory for providing a first signal representative of the cosine of θ in response to receipt of the θ angle signal; and means for providing the first signal to the means for multiplying cos φ by cos θ.

8. A system according to claim 7, wherein the means for computing the altitude H comprises a second memory for providing a second signal representative of the tangent of θ in response to receipt of the angle signal θ; and a multiplier for multiplying the second signal when θ equals $θ_c$ by the value of $R_c$ that is computed when θ equals $θ_c$ to provide an altitude signal for indicating the altitude H of the selected target.

9. A system according to claim 8, wherein the means for computing the slant range S comprises means for computing the square root of the sum of the square of the horizontal range signal and the square of the altitude signal to provide a slant range signal for indicating the slant range S from the radar system to the selected target.

10. A bistatic passive radar system for use in conjunction with a host transmitter that is a determinable distance D from the radar system, and which includes means for determining the distance D, a display and means for displaying video images of a selected target, the position of radar system and the position of the transmitter on the display, characterized by the means for displaying the video image of the selected target includes means for determining the azimuth angle φ between the extension of a line extending from the radar system through the host transmitter and a line extending from the host transmitter to the selected target; means for determining the apparent range $R_a$ from the host transmitter to the selected target; and means for computing the corrected range $R_c$ from the host transmitter to the selected target in accordance with the equation:

$$R_c = \frac{(R_a^2 + 2R_aD)\cos θ}{2R_a + 2D(1 - \cos φ \cos θ)};$$

and by the system comprising means for displaying a first cursor on the display extending from the displayed position of the host transmitter to bisect the video image of the selected target;

means for determining the azimuth angle B between the line of sight from the radar system to the host transmitter and a line extending from the radar system to the selected target;

means for displaying a second cursor on the display at the angle B from a line extending between the displayed positions of the radar system and the host transmitter, and for extending the second cursor from the displayed position of the radar system toward the first cursor;

means for determining the angle of elevation E from the radar system to the selected target;

means for multiplying the quantity cos φ by a quantity cos θ to provide the term cos φ cos θ when computing $R_c$, wherein θ is a variable angle of elevation from the host transmitter, whereby when θ is the angle of the elevation $θ_c$ from the host transmitter to the selected target, the video image of the selected target is aligned with the second cursor;

means for computing the altitude H of the selected target relative to the position of the radar system by using the angle of elevation $θ_c$ and the value of $R_c$ that is computed when θ equals $θ_c$; and means for computing the slant range S of the selected target relative to the position of the radar system by using the computed altitude H and the determined angle of elevation E from the radar system to the selected target.

11. A system according to claim 10, comprising means for providing a variable θ angle signal for indicating the value of θ;

a first memory for providing a first signal representative of the cosine of θ in response to receipt of the θ angle signal; and means for providing the first signal to the means for multiplying cos φ by cos θ.

12. A system according to claim 11, wherein the means for computing the altitude H comprises a second memory for providing a second signal representative of the tangent of θ in response to receipt of the θ angle signal; and a multiplier for multiplying the second signal when θ equals $θ_c$ by the value of $R_c$ that is computed when θ equals $θ_c$ to provide an altitude signal for indicating the altitude H of the selected target.

13. A system according to claim 12, wherein the means for determining the angle of elevation E from the radar system to the selected target comprises a tracking system for tracking the selected target; and means coupled to the tracking system for providing an E angle signal for indicating the angle of elevation E at which the selected target is tracked.

14. A system according to claim 13, wherein the means for computing the slant range S comprises a third memory for providing a third signal representative of the sine of E in response to receipt of the E angle signal; and a divider for dividing the altitude signal by the third signal to provide a slant range signal for indicating the slant range S from the radar system to the selected target.

15. A method wherein a bistatic passive radar system is used in conjunction with a host transmitter that is a determinable distance D from the radar system, for determining the distance D and for displaying video images of a selected target, the position of the radar system and the position of the transmitter on a display, characterized by the steps of:

(a) displaying the video image of the selected target by determining the azimuth angle φ between the extension of a line extending from the radar system through the host transmitter and a line extending from the host transmitter to the selected target; determining the apparent range $R_a$ from the host transmitter to the selected target; and computing the corrected range $R_c$ from the host transmitter to the selected target in accordance with the equation:

$$R_c = \frac{R_a^2 + 2R_a D}{2R_a + 2D(1 - \cos\phi\cos\theta)};$$

(b) displaying a first cursor on the display extending from the displayed position of the host transmitter to bisect the video image of the selected target:

(c) determining the azimuth angle B between the line of sight from the radar system to the host transmitted and a line extending from the radar system to the selected target;

(d) displaying a second cursor on the display at the angle B from a line extending between the displayed positions of the radar system and the host transmitter, and extending the length of the second cursor from the displayed position of the radar system to terminate at the first cursor;

(e) determining the horizontal range C from the radar system to the selected target in accordance with the length of the second cursor;

(f) multiplying the quantity cos φ by a quantity cos θ to provide the term cos φ cos θ when computing $R_c$, wherein θ is a variable angle of elevation from the host transmitter, whereby when θ is the angle of the elevation $\theta_c$ from the host transmitter to the selected target, the video image of the selected target is aligned with the second cursor;

(g) computing the altitude H of the selected target relative to the position of the radar system by using the angle of elevation $\theta_c$ and the value of $R_c$ that is computed when θ equals $\theta_c$; and (h) computing the slant range S of the selected target relative to the position of the radar system by using the computed altitude H and the determined horizontal range C from the radar system to the selected target.

16. A method according to claim 15, wherein step (e) comprises the steps of:

(i) controlling the length of the second cursor; and (j) providing a horizontal range signal as a function of second cursor length for indicating the horizontal range C from the radar system to the selected target.

17. A method according to claim 16, comprising the steps of:

(k) providing a variable θ angle signal for indicating the value of θ;

(l) providing a first signal representative of the cosine of θ from a first memory in response to receipt of the θ angle signal; and (m) providing the first signal for multiplying cos φ by cos θ.

18. A method according to claim 17, wherein step (g) comprises the steps of:

(n) providing a second signal representative of the tangent of θ from a second memory in response to receipt of the angle signal θ; and (o) multiplying the second signal when θ equals $\theta_c$ by the value of $R_c$ that is computed when θ equals $\theta_c$ to provide an altitude signal for indicating the altitude H of the selected target.

19. A method according to claim 18, wherein step (h) comprises the step of:

(p) computing the square root of the sum of the square of the horizontal range signal and the square of the altitude signal to provide a slant range signal for indicating the slant range S from the radar system to the selected target.

20. A method wherein a bistatic passive radar system in conjunction with a host transmitter that is a determinable distance D from the radar systems for determining the distance D and for displaying video images of a selected target, the position of the radar system and the position of the transmitter on a display, characterized by the steps of:

(a) displaying the video image of the selected target by determining the azimuth angle φ between the extension of a line extending from the radar system through the host transmitter to the selected target; determining the apparent range $R_a$ from the host transmitter to the selected target; and computing the corrected range $R_c$ from the host transmitter to the selected target in accordance with the equation:

$$R_c = \frac{(2R_a^2 + 2R_a D)\cos\theta}{2R_a + 2D(1 - \cos\phi\cos\theta)};$$

(b) displaying a first cursor on the display extending from the displayed position of the host transmitter to bisect the video image of the selected target;

(c) determining the azimuth angle B between the line of sight from the radar system to the host transmitter and a line extending from the radar system to the selected target;

(d) displaying a second cursor on the display at the angle B from a line extending between the displayed positions of the radar system and the host transmitter, and for extending the second cursor from the displayed position of the radar system toward the first cursor;

(e) determining the angle of elevation E from the radar system to the selected target;

(f) multiplying the quantity cos φ by a quantity cos θ to provide the term cos φ cos θ when computing $R_c$, wherein θ is a variable angle of elevation from the host transmitter, whereby when θ is the angle of the elevation $\theta_c$ from the host transmitter to the selected target, the video image of the selected target is aligned with the second cursor;

(g) computing the altitude H of the selected target relative to the position of the radar system by using the angle of elevation $\theta_c$ and the value of $R_c$ that is computed when θ equals $\theta_c$; and (h) computing the slant range S of the selected target relative to the position of the radar system by using the computed altitude H and the determined angle of elevation E from the radar system to the selected target.

21. A method according to claim 20, comprising the steps of:
(i) providing a variable θ angle signal for indicating the value of θ;
(j) for providing a first signal representative of the cosine of θ from a first memory in response to receipt of the θ angle signal; and
(k) providing the first signal for multiplying cos θ by cos θ.

22. A method according to claim 21, wherein step (g) comprises the steps of:
(l) for providing a second signal representative of the tangent of θ from a second memory in response to receipt of the θ angle signal; and
(m) multiplying the second signal when θ equals $θ_c$ by the value of $R_c$ that is computed when θ equals $θ_c$ to provide an altitude signal for indicating the altitude H of the selected target.

23. A method according to claim 22, wherein step (e) comprises the steps of:
(n) tracking the selected target; and
(o) providing an E angle signal for indicating the angle of elevation E at which the selected target is tracked.

24. A method according to claim 23, wherein step (h) comprises the steps of:
(p) providing a third signal representative of the sine of E from a third memory in response to receipt of the E angle signal; and
(q) dividing the altitude signal by the third signal to provide a slant range signal for indicating the slant range S from the radar system to the selected target.

25. A bistatic passive radar system for use in conjunction with a host transmitter that is a determinable distance D from the radar system, and which includes means for determining the distance D, a display and means for displaying video images of a selected target, the position of the radar system and the position of the transmitter on the display, characterized by
means for displaying a first cursor on the display extending from the displayed position of the host transmitter to bisect the video image of the selected target;
means for determining the azimuth angle B between the line of sight from the radar system to the host transmitter and a line extending from the radar system to the selected target;
means for displaying a second cursor on the display at the angle B from the line extending between the displayed positions of the radar system and the host transmitter, and for extending the length of the second cursor from the displayed position of the radar system to terminate at the first cursor:
means for determining the horizontal range C from the radar system to the selected target in accordance with the length of the second cursor;
means for determining the angle of elevation E from the radar system to the selected target; and
means for computing the slant range S and the altitude H of the selected target relative to the position of the radar system by using the determined horizontal range C from the radar system to the selected target and the determined angle of elevation E from the radar system to the selected target;
wherein the means for determining the horizontal range C from the radar system to the selected target comprises
a cursor length control for controlling the length of the second cursor, and
a cursor length-to-range converter coupled to the cursor length control for providing a horizontal range signal as a function of second cursor length for indicating the horizontal range C from the radar system to the selected target;
wherein the means for determining the angle of elevation comprises
a tracking system for tracking the selected target; and
means coupled to the tracking system for providing an E angle signal for indicating the angle of elevation E at which the selected target is tracked; and
wherein the means for computing the slant range and altitude comprises
a first memory for providing a first signal representative of the tangent of the angle of elevation E in response to receipt of the E angle signal;
a second memory for providing a second signal representative of the cosine of the angle of elevation E in response to receipt of the E angle signal;
a multiplier for multiplying the first signal by the horizontal range signal to provide an altitude signal for indicating the altitude H of the selected target; and
a divider for dividing the horizontal range signal to provide a slant range signal for indicating the slant range S from the radar system to the selected target.

26. A method wherein a bistatic passive radar system is used in conjunction with a host transmitter that is a determinable distance D from the radar system, for determining the distance D and for displaying video images of a selected target, the position of the radar system and the position of the transmitter on a display, characterized by the steps of:
(a) displaying a first cursor on the display extending from the displayed position of the host transmitter to bisect the video image of the selected target;
(b) determining the azimuth angle B between the line of sight from the radar system to the host transmitter and a line extending from the radar system to the selected target;
(c) displaying a second cursor on the display at the angle B from the line extending between the displayed positions of the radar system and the host transmitter, and extending the length of the second cursor from the displayed position of the radar system to terminate at the first cursor;
(d) determining the horizontal range C from the radar system to the selected target in accordance with the length of the second cursor;
(e) determining the angle of elevation E from the radar system to the selected target; and
(f) computing the slant range S and the altitude H of the selected target relative to the position of the radar system by using the determined horizontal range C from the radar system to the selected target and the determined angle of elevation E from the radar system to the selected target;

wherein step (d) comprises the steps of:
  (g) controlling the length of the second cursor; and
  (h) providing a horizontal range signal as a function of second cursor length for indicating the horizontal range C from the radar system to the selected target;
wherein step (e) comprises the steps of:
  (i) tracking the selected target; and
  (j) providing an E angle signal for indicating the angle of elevation E at which the selected target is tracked; and
wherein step (f) comprises the steps of:
  (k) providing a first signal representative of the tangent of the angle of elevation E from a first memory in response to receipt of the E angle signal;

(l) providing a second signal representative of the cosine of the angle of elevation E from a second memory in response to receipt of the E angle signal;

(m) multiplying the first signal by the horizontal range signal to provide an altitude signal for indicating the altitude H of the selected target; and (n) dividing the horizontal range signal to provide a slant range signal for indicating the slant range S from the radar system to the selected target.

* * * * *